(12) United States Patent
Kim

(10) Patent No.: US 7,907,214 B2
(45) Date of Patent: Mar. 15, 2011

(54) DISPLAY APPARATUS AND CONTROL METHOD OF THE SAME

(75) Inventor: Mi-kyung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1132 days.

(21) Appl. No.: 11/585,236

(22) Filed: Oct. 24, 2006

(65) Prior Publication Data

US 2007/0091208 A1 Apr. 26, 2007

(30) Foreign Application Priority Data

Oct. 24, 2005 (KR) ........................ 10-2005-0100452

(51) Int. Cl.
*H04N 5/445* (2006.01)
*H04N 5/45* (2006.01)
*H04N 7/00* (2006.01)
*H04N 9/74* (2006.01)

(52) U.S. Cl. ......... 348/564; 348/565; 348/468; 348/589

(58) Field of Classification Search .................. 348/468, 348/563–565, 569, 589, 598, 600; H04N 7/00, H04N 5/445, 5/45, 9/74, 9/76, 5/50

See application file for complete search history.

(56) References Cited

U.S. PATENT DOCUMENTS

| 5,929,927 | A  | * | 7/1999 | Rumreich et al. | ............ 348/564 |
| 6,295,093 | B1 | * | 9/2001 | Park et al. | ..................... 348/468 |
| 6,816,201 | B1 |   | 11/2004 | Fang et al. | |

FOREIGN PATENT DOCUMENTS

| KR | 10-1994-0009481 A | 4/1994 |
| KR | 10-2000-0021110 A | 4/2000 |
| KR | 2000-0055526 A | 9/2000 |
| KR | 2001-0039390 A | 5/2001 |
| KR | 10-2001-0048558 A | 6/2001 |
| KR | 10-2005-0021684 A | 3/2005 |

OTHER PUBLICATIONS

Korean Office Action issued on Aug. 24, 2010 in the corresponding Korean Patent Application No. 10-2005-0100452.

* cited by examiner

*Primary Examiner* — Sherrie Hsia
(74) *Attorney, Agent, or Firm* — Sughrue Mion, PLLC

(57) ABSTRACT

A control method of a display apparatus including processing a broadcasting signal of a currently tuned channel and displaying the broadcasting signal on a main picture; extracting broadcasting program information of other currently broadcasting channels if a caption indicating function of the broadcasting program information is selected; and creating the extracted broadcasting program information in a caption, displaying the caption on a portion of the main picture, and scrolling the caption along a predetermined direction. Thus, the present invention provides a display apparatus, which can create and scroll broadcasting information for the other currently broadcasting channel in a caption while the viewer is observing a main image, thus allowing the viewer to see the broadcasting information for the other channel conveniently and allowing the main image to be conveniently switched to a different desired channel, and a control method of the display apparatus.

23 Claims, 3 Drawing Sheets

DISPLAY APPARATUS AND CONTROL METHOD OF THE SAME

CROSS-REFERENCE TO RELATED APPLICATIONS

This application claims the priority from Korean Patent Application No. 10-2005-0100452, filed on Oct. 24, 2005, in the Korean Intellectual Property Office, the entire disclosure of which is hereby incorporated by reference.

BACKGROUND OF THE INVENTION

1. Field of the Invention

Apparatuses and methods consistent with the present invention relate to a display apparatus and a control method of the same, and more particularly, to a display apparatus for displaying information with regard to broadcasting programs on a screen, and a control method of the same.

2. Description of the Related Art

In general, broadcasting signals are transmitted in such a manner that guide information (for example, Electronic Programming Guide (EPG) information) for the broadcasting programs is included in the broadcasting signals. In a case of analog broadcasting, the corresponding information can be conveyed to be transmitted utilizing vertical blanking intervals (VBIs). In another case of digital broadcasting, the guide information for the broadcasting program can be serviced by utilizing a corresponding channel or a separate transmission channel.

A television (TV) can receive the guide information for the broadcasting programs to create a guide table, which can be displayed to a viewer. Thus, the viewer can conveniently select and view desired broadcasting programs.

In this instance, the guide table indicating the broadcasting programs would be displayed in full screen size so that it could seriously disturb the viewing by the viewer. Even if the guide table is displayed on a portion of a video image of a channel currently observed by the viewer, it inevitably occupies certain portions of the currently displayed video image due to the limitation applied by the format of the table.

Furthermore, in order for the viewer to select the desired channel through the information of the broadcasting programs shown in the table format, a number of key operations are needed to move a cursor and turn a page.

SUMMARY OF THE INVENTION

The present invention provides a display apparatus, which can create and scroll broadcasting information for the other currently broadcasting channel in a caption while the viewer is observing a main image, thus allowing the viewer to see the broadcasting information for the other channel conveniently and allowing the main image to be conveniently switched to a different desired channel, and a control method of the display apparatus.

According to an aspect of the present invention, there is provided a control method of a display apparatus, comprising: processing a broadcasting signal of a currently tuned channel and displaying the broadcasting signal on a main picture; extracting broadcasting program information of other currently broadcasting channels if a caption indicating function of the broadcasting program information is selected; and creating the extracted broadcasting program information in a caption, displaying the caption on a portion of the main picture, and scrolling the caption along a predetermined direction.

According to an aspect of the present invention, the scrolling the caption comprises positioning an indicating highlight at a desired broadcasting program of the broadcasting program information indicated by the caption, and moving the indicating highlight sequentially by every program.

According to an aspect of the present invention, the control method further comprises switching a channel corresponding to the broadcasting program for which a user selects a main picture viewing function among the broadcasting program information indicated by the caption into the main picture.

According to an aspect of the present invention, the switching the channel into the main picture comprises switching into a corresponding channel, if a viewing function of the broadcasting program at which the indicating highlight is positioned, is selected.

According to an aspect of the present invention, the control method further comprises tuning a channel corresponding to the broadcasting program at which the indicating highlight is positioned and displaying the channel in a sub-picture, if a Picture-In-Picture (PIP) function is selected.

According to an aspect of the present invention, the displaying the channel in the sub-picture comprises switching the channel displayed on the sub-picture according to the movement of the indicating highlight.

According to an aspect of the present invention, the control method further comprises switching the channel displayed on the sub-picture into the main picture if the main picture viewing function of the channel displayed on the sub-picture is selected.

According to an aspect of the present invention, the control method further comprises turning off the caption indicating function if a PIP continuous viewing function of the channel displayed on the sub-picture is selected, and continuously displaying on the sub-picture the channel currently displayed on the sub-picture.

According to an aspect of the present invention, the broadcasting program information indicated in the caption comprises at least one of a channel number, a channel name, and a program name.

According to another aspect of the present invention, there is provided a display apparatus having a channel tuning unit, a signal processing unit for processing a broadcasting signal of a tuned channel, and a display, comprising: a memory for storing broadcasting program information; a caption generating unit; and a control unit for, if a caption indicating function of the broadcasting program information is selected, extracting broadcasting program information of other currently broadcasting channel, controlling the caption generating unit to create the extracted broadcasting program information in a caption, controlling the caption to be displayed on a portion of a main picture on which an image signal corresponding to the currently tuned channel is displayed, and controlling the caption to be scrolled along a predetermined direction.

According to an aspect of the present invention, the display apparatus further comprises a user-input unit, wherein the control unit controls an indicating highlight to be positioned at a broadcasting program selected by the user-input unit among the broadcasting program information displayed by the caption, and controls the indicating highlight to be moved sequentially by every program.

According to an aspect of the present invention, the control unit tunes a channel corresponding to a broadcasting program at which the indicating highlight is positioned, controls the channel to be displayed in a sub-picture if a PIP function is selected, and controls the channel displayed on the sub-picture to be switched according to the movement of the indicating highlight.

According to an aspect of the present invention, the control unit turns off the caption indicating function if a PIP continuous viewing function of the channel displayed on the sub-picture is selected, and controls the channel currently displayed on the sub-picture to be continuously displayed on the sub-picture.

According to an aspect of the present invention, the control unit controls the channel displayed on the sub-picture to be switched into the main picture if a main picture viewing function of the channel displayed on the sub-picture is selected via the user-input unit.

According to an aspect of the present invention, if a viewing function of a broadcasting program at which the indicating highlight is positioned is selected, the control unit controls a corresponding channel to be switched into the main picture.

According to an aspect of the present invention, the display apparatus further comprises a user-input unit, wherein the control unit controls a channel corresponding to a broadcasting program of which a main picture viewing function is selected through the user-input unit among the program information indicated in the caption to be switched into the main picture.

According to an aspect of the present invention, the broadcasting program information indicated in the caption comprises at least one of a channel number, a channel name, and a program name.

BRIEF DESCRIPTIONS OF THE DRAWINGS

The above and/or other aspects of the present invention will become apparent and more readily appreciated from the following description of the exemplary embodiments, taken in conjunction with the accompanying drawings of which:

DETAILED DESCRIPTION OF EXEMPLARY EMBODIMENTS

Reference will now be made in detail to exemplary embodiments of the present invention, examples of which are illustrated in the accompanying drawings. In the exemplary embodiments of the present invention, an explanation will be given to a digital television by way of example.

Figure 1:
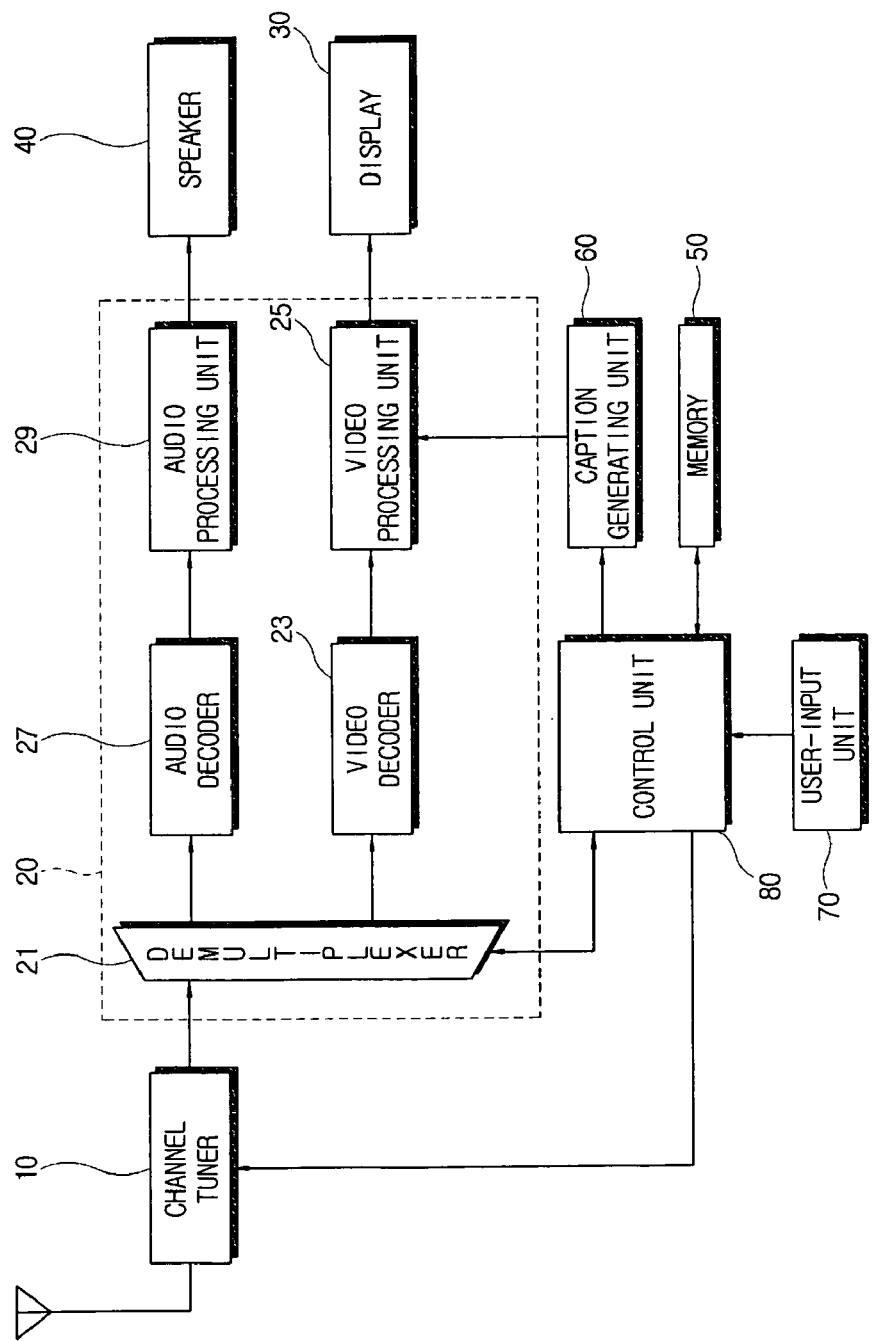
FIG. 1 is a block diagram of a television according to an exemplary embodiment of the present invention.

FIG. 1 is a block diagram of a digital television according to one exemplary embodiment of the present invention.

As shown in FIG. 1, a digital television according to an exemplary embodiment of the present invention comprises a channel tuner 10, a signal processing unit 20, a display 30, a speaker 40, a memory 50, a caption generating unit 60 and a control unit 80.

The channel tuner 10 may be composed of one or more tuners for tuning broadcasting signals received by an antenna, and a demodulator for Vestigial Side Band (VSB) modulating and error correcting the tuned signals to output the processed tuned signals in a format of a transport stream. The channel tuner 10 tunes the broadcasting signals having a frequency band corresponding to a tuning control signal of the control unit 80, which will be described later.

The digital broadcasting signals of the channel, tuned as above, are displayed on the display 30 after being subjected to a process by the signal processing unit 20. Here, the signal processing unit 20 may comprise a demultiplexer 21, a video decoder 23, a video processing unit 25, an audio decoder 27, and an audio processing unit 29.

The demultiplexer 21 separates the tuned broadcasting signals into a video signal, an audio signal, various additional data defined by PSIP (Program and Service Information Protocol) information, etc. Then, the demultiplexer 21 outputs the separated signal and data in a format of a bit stream.

In addition, the video decoder 23 decodes the video signal separated by the demultiplexer 21. The video processing unit 25 processes the decoded video signal in compliance with an output format of the display 30 and outputs the processed video signal to the display 30. Here, the video processing unit 25 may comprise a scaler that transforms the decoded video signal into signals adapted to a vertical frequency, a resolution, an aspect ratio of a screen, etc. according to the output format of the display 30.

In this exemplary embodiment, the display 30 may be embodied as various types of display modules, such as a Digital Light Processing (DLP), a Liquid Crystal Display (LCD), and a Plasma Display Panel (PDP).

The audio signal separated by the demultiplexer 21 is decoded by the audio decoder 27, processed by the audio processing unit 29 in compliance with an output format of the speaker 40, and then replayed through the speaker 40.

Meanwhile, the various additional data based on PSIP, separated by the demultiplexer 21, may include EPG information which is the guide information regarding the broadcasting program. The received EPG information is stored into the memory 50 by the control unit 80, which will be described later.

Here, the EPG information may comprise System Time Table (STT) information, Master Guide Table (MGT) information, Virtual Channel Table (VCT) information, Rating Region Table (RRT) information, Event Information Table (EIT) information, and Extended Text Table (ETT) information.

The caption generating unit 60 generates a predetermined caption and an indicating highlight under the control of the control unit 80, which will be described later, and may be comprised of an On Screen Display (OSD) generator.

A user-input unit 70 is utilized to select a channel, a function to display the broadcasting information by the caption, a PIP function, etc. The user-input unit 70 may comprise a menu key provided on a remote controller, and a keystroke signal generator for generating a keystroke signal corresponding to a keystroke. Here, the user-input unit 70 can be implemented by a mouse or a keyboard, or alternatively, may be provided in a body panel of a television.

The control unit 80 receives the keystroke signal created by the user-input unit 70 and then controls a function corresponding to the keystroke signal to be performed. The control unit 80 may be implemented by a controller such as a central processing unit (CPU), and/or a processor and an algorithm.

Once the caption indicating function of displaying the broadcasting information is selected by the user-input unit 70, the control unit 80 extracts currently broadcasting program information of the other channel from the EPG information stored in the memory 50, and then controls the caption generating unit 60 to generate the caption. The caption thus generated is mixed with a video image of the currently tuned channel and then displayed on the display 30. The caption is displayed on a portion of a main picture currently being displayed on the display 30. This portion can be set within an area so that the viewing of the main picture is not disturbed.

Further, the caption displayed on the screen is automatically scrolled in one of predetermined direction pursuant to the control of the control unit 80. The size of the caption, the scrolling speed of the caption, and the scrolling direction can be set or adjusted according to product specification or by the user.

Here, once the function of viewing the main picture is selected by the user-input unit 70 (e.g., by keystroke input), the control unit 80 applies a corresponding channel tuning control signal to the channel tuner 10 so that a channel corresponding to the broadcasting program where the indicating highlight is positioned, is tuned and then the main picture is switched to the tuned channel. In this case, the caption display is turned off. Thus, the user can conveniently switch the channel to the other desired channels.

Also, once a PIP viewing function is selected by the user-input unit 70 (e.g., the PIP function keystroke input), the control unit 80 applies a corresponding channel tuning control signal to the channel tuner 10 so that a channel corresponding to the broadcasting program where the indicating highlight is positioned, is tuned and then the video image of the tuned channel is displayed on a sub-picture. The television according to the exemplary embodiment of the present invention may be provided with a PIP function. The channel tuner 10 may include a main tuner for tuning a channel corresponding to the main picture and a sub tuner for tuning the channel corresponding to the sub picture.

The channel corresponding to the sub picture indicated in this way can be switched according to the movement of the indicating highlight. By this construction, the user can view a video image which corresponds to the broadcasting program where the indicating highlight is positioned, through the PIP function.

Also, if the main picture viewing function for the channel selected for the sub picture, is selected, the control unit 80 switches the channel corresponding to the sub picture into the main picture and then turns the PIP function off. Thus, the user can conveniently switch a currently viewed channel into other desired channels. More details of the control unit 80 will be described later.

Figure 2:
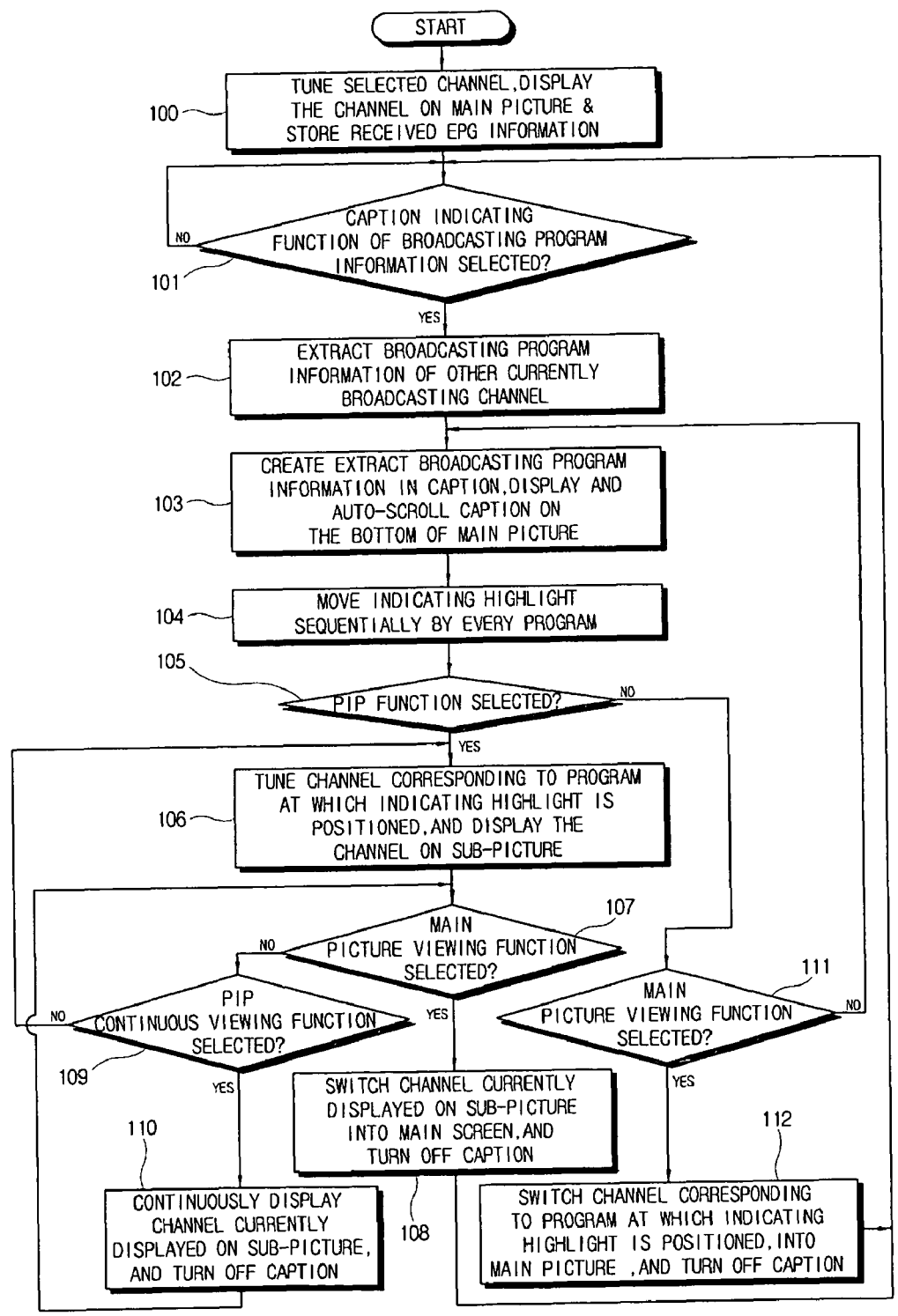
FIG. 2 is a flowchart of a control method for a television according to an exemplary embodiment of the present invention.
Figure 3:
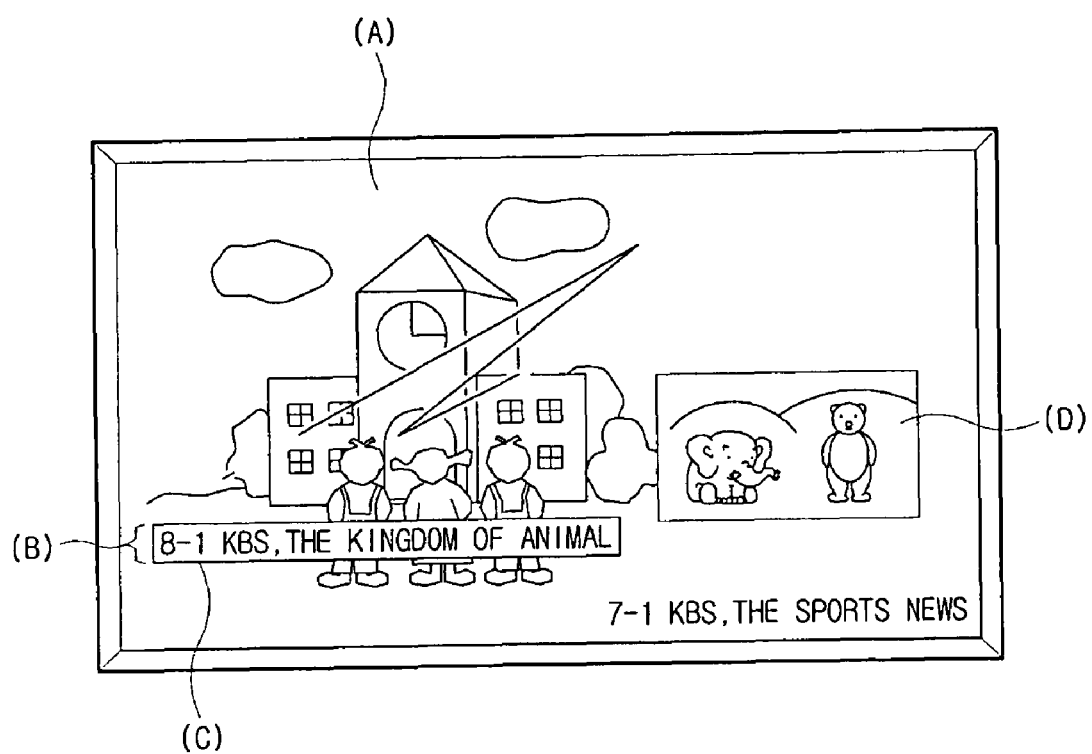
FIG. 3 is a view showing picture displayed on a display of FIG. 1.

Now, a method of generating a caption for a TV and a method of switching a channel according to an exemplary embodiment of the present invention are described with reference to FIGS. 2 and 3. FIG. 2 is a control flowchart of a TV according to the exemplary embodiment of the present invention, and FIG. 3 shows picture of the display 30 according to the exemplary embodiment of the present invention. In this exemplary embodiment, a caption is displayed at the bottom of the main picture.

The control unit 80 applies a corresponding control signal to the channel tuner 10 so that the frequency of the channel selected by the user-input unit 70 is tuned. The video image of the channel thus tuned is processed by the signal processing unit 20 and then is displayed as the main picture on the display 30 at operation 100. As described earlier, if the EPG information exists in the broadcasting signal, the control unit 80 stores the received EPG information into the memory 50 at operation 100.

If a caption indicating function of displaying the broadcasting information is selected via the user-input unit 70 at operation 101, the control unit 80 extracts broadcasting program information of other currently broadcasting channels from the stored EPG information at operation 102.

Then, the caption generating unit 60 creates the caption with regard to the broadcasting program information based on the extracted information at operation 103. The caption thus generated is mixed with the video image of the currently tuned channel to be displayed at the bottom (B) of the main picture (A) which is the image of the currently tuned channel, as shown in FIG. 3, at operation 103.

As shown in FIG. 3, the information with regard to the other currently broadcasting channels, such as the channel number, the channel name, and the program name, is indicated in the caption. The user can easily know which programs are currently broadcasting in the other channels through this caption.

The caption displayed at the bottom of the main picture, as described above, is automatically scrolled from the left to the right by the control of the control unit 80 at operation 103. At this time, the indicating highlight (C) may be positioned on the broadcasting program information or a specific program indicated in the caption. The control unit 80 controls the caption generating unit 60 so that the indicating highlight is automatically moved for every program at operation 104.

For example, the indicating highlight currently positioned at "8-1 KBS, The Kingdom of Animal" is moved along the direction of the scroll along with the "8-1 KBS, The Kingdom of Animal" as the caption moves during a predetermined period. After the elapse of the predetermined period, the indicating highlight is moved in a direction opposite to the direction of the scroll to at the "7-1 KBS, The Sports News." The control unit 80 renders the automatic scroll of the caption and the movement of the indicating highlight to be performed repetitively until the function of displaying the caption is turned off.

If the PIP function is selected via the user-input unit 70 in the course of performing the function of displaying the caption at operation 105, the control unit 80 applies a tuning control signal to the tuning control part so that the channel corresponding to the broadcasting program where the indicating highlight is positioned is tuned, and controls the signal processing unit 20 to display the image corresponding to the channel on the sub-picture at operation 106. As shown in FIG. 3, the sub-picture, i.e., the video image corresponding to "8-1 KBS, The Kingdom of Animal" where the indicating highlight is currently positioned, is displayed in the portion D.

Also, when the indicating highlight is moved to a next program of "7-1 KBS, The Sports News," the video image in the portion D is switched to another video image corresponding to "7-1 KBS, The Sports News." The switching of sub-picture pursuant to the movement of the indicating highlight in this manner is repetitively performed until one of turning off of the PIP function, the PIP continuous viewing function and turning off of the caption function is selected.

If a main picture viewing function is selected for the channel displayed in the sub-picture via the user-input unit 70 during the performance of the PIP function at operation 107, the control unit 80 switches the channel currently being displayed in the sub-picture to the main channel and turns off the caption at operation 108.

Also, if the PIP continuous viewing function is selected via the user-input unit 70 after selecting the PIP function at operation 109, the control unit 80 allows the video image of the channel currently being displayed on the sub-picture to be continuously displayed and turns off the caption at operation 110. Accordingly, the user can view simultaneously a plurality of desired channels via the main picture and the sub-picture.

Further, if the PIP function is not selected, i.e., the main picture viewing function of the caption is selected while the main picture and the caption are being displayed at operation 111, the control unit 80 applies a corresponding tuning control signal to the channel tuner 10 in order to tune the channel corresponding to the broadcasting program where the indicating highlight is positioned, thus allowing switching of the main picture, and, finally, the caption is turned off, at operation 112. Thus, the user conveniently switches the channel by selecting the desired channel via the caption.

Although a digital TV is described by way of example according to the exemplary embodiments of the present invention, it should be understood that the present invention can be applied to an analog and digital combined TV and a display apparatus equipped with a function of receiving a TV signal.

As apparent from the above description, the present invention provides a display apparatus, which can create and automatically scroll broadcasting information for the other currently broadcasting channel in a caption while the viewer is observing a main picture, thus allowing the viewer to see the broadcasting information for the other channel conveniently and allowing the main picture to be conveniently switched to a different desired channel, and a control method of the display apparatus.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A control method of a display apparatus, the control method comprising:
    processing a broadcasting signal of a currently tuned channel and displaying the broadcasting signal in a main picture;
    extracting broadcasting program information of other currently broadcasting channels if a caption indicating function of displaying the broadcasting program information is selected;
    generating the extracted broadcasting program information in a caption;
    displaying the caption on a portion of the main picture; and
    scrolling the caption along a predetermined direction.

2. The control method according to claim 1, wherein the scrolling the caption comprises positioning a highlight at a desired broadcasting program of the broadcasting program information displayed by the caption, and moving the highlight to another displayed broadcasting program.

3. The control method according to claim 2, further comprising:
    selecting a main picture viewing function for the broadcasting program among the broadcasting program information displayed by the caption; and
    switching to a channel corresponding to the broadcasting program as the main picture.

4. The control method according to claim 3, wherein the switching to the channel corresponding to the broadcasting program as the main picture comprises switching to the channel corresponding to the broadcasting program if a viewing function of the broadcasting program where the highlight is positioned, is selected.

5. The control method according to claim 4, further comprising:
    tuning the channel corresponding to the broadcasting program where the highlight is positioned; and
    displaying the channel in a sub-picture, if a Picture-In-Picture (PIP) function is selected.

6. The control method according to claim 5, wherein the displaying the channel in the sub-picture comprises switching to the channel displayed in the sub-picture according to a movement of the highlight.

7. The control method according to claim 6, further comprising switching to the channel displayed in the sub-picture as the main picture if the main picture viewing function of the channel displayed on the sub-picture, is selected.

8. The control method according to claim 6, further comprising:
    turning off the caption indicating function if a PIP continuous viewing function of the channel displayed on the sub-picture is selected; and
    continuously displaying on the sub-picture, the channel currently displayed on the sub-picture.

9. The control method according to claim 1, further comprising:
    selecting a main picture viewing function for a broadcasting program among the broadcasting program information displayed by the caption; and
    switching to a channel corresponding to the broadcasting program as the main picture.

10. The control method according to claim 9, wherein the switching to the channel corresponding to the broadcasting program as the main picture comprises switching to the channel corresponding to the broadcasting program as the main picture if a viewing function of the broadcasting program where the highlight is positioned, is selected.

11. The control method according to claim 10, further comprising tuning the channel corresponding to the broadcasting program where the highlight is positioned and displaying the channel in a sub-picture, if a Picture-In-Picture (PIP) function is selected.

12. The control method according to claim 11, wherein the displaying the channel in the sub-picture comprises switching to the channel displayed in the sub-picture according to a movement of the highlight.

13. The control method according to claim 12, further comprising switching to the channel displayed in the sub-picture as the main picture if the main picture viewing function of the channel displayed on the sub-picture, is selected.

14. The control method according to claim 12, further comprising turning off the caption indicating function if a PIP continuous viewing function of the channel displayed in the sub-picture is selected, and continuously displaying on the sub-picture, the channel currently displayed on the sub-picture.

15. The control method according to claim 1, wherein the broadcasting program information displayed in the caption comprises at least one of a channel number, a channel name, and a program name.

16. A display apparatus comprising:
    a signal processing unit which processes a broadcasting signal of a currently tuned channel;
    a display;
    a memory which stores broadcasting program information;
    a caption generating unit; and
    a control unit which, if a caption indicating function of displaying the broadcasting program information is selected, extracts broadcasting program information of other currently broadcasting channels, controls the caption generating unit to generate the extracted broadcasting program information in a caption, controls the caption to be displayed on a portion of a main picture on which an image signal corresponding to the currently tuned channel is displayed, and scrolls the caption.

17. The display apparatus according to claim 16, further comprising a user-input unit, wherein the control unit controls a highlight to be positioned at a broadcasting program selected through the user-input unit, among the broadcasting program information displayed by the caption, and moves the highlight to be positioned at another displayed broadcast program in a movement of the highlight.

18. The display apparatus according to claim 17 further comprising a channel tuner, wherein the control unit controls the channel tuner to tune a channel corresponding to the broadcasting program where the highlight is positioned, controls the channel to be displayed in a sub-picture if a Picture-In-Picture (PIP) function is selected, and controls switching the channel displayed in the sub-picture according to the movement of the highlight.

19. The display apparatus according to claim 18, wherein the control unit turns off the caption indicating function if a PIP continuous viewing function of the channel displayed in the sub-picture is selected, and controls the channel currently displayed in the sub-picture to be continuously displayed on the sub-picture.

20. The display apparatus according to claim 18, wherein the control unit controls the channel displayed in the sub-picture to be switched to the main picture if a main picture viewing function of the channel displayed in the sub-picture is selected via a user-input unit.

21. The display apparatus according to claim 17, wherein, if a viewing function of the broadcasting program where the highlight is positioned, is selected, the control unit switches a channel corresponding to the broadcasting program as the main picture.

22. The display apparatus according to claim 16 further comprising a user-input unit, wherein a main picture viewing function is selected for a broadcasting program among the program information displayed in the caption, through the user-input unit and the control unit switches a channel corresponding to the broadcasting program as the main picture.

23. The display apparatus according to claim 16, wherein the broadcasting program information displayed in the caption comprises at least one of a channel number, a channel name, and a program name.

* * * * *